BEST AVAILABLE COPY

T857033

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 696

701,845

400

PROCESS FOR PREPARING 4,4'-BIS(2-BENZOXAZOLYL) STILBENE, DERIVATIVES, AND HETEROCYCLIC ANALOGS

Melvin S. Bloom, Kodak Park, Rochester, N.Y., and Mary E. Martin, P.O. Box 511, Johnson City, Tenn. 37662

Filed Jan. 31, 1968. Published Dec. 17, 1968
Class 260—240
No Drawing. 28 Pages Specification Process for the preparation of symmetrical and asymmetrical 4,4'-bis(benzazolyl)stilbenes by (I) reacting the corresponding 2-benzazolyl-4-benzyl halide derivative with an organophosphorous compound of formula $P(Q)_3$ wherein Q is lower alkoxy or aryl to form the interaction product thereof which is then (II) treated with a proton acceptor to form an alkylidenephosphorane of the formula

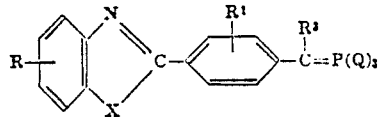

wherein X is $NR^2$, —O— or —S— in which $R^2$ is H or lower alkyl, R and $R^1$ are H or substituents such as alkyl, aryl, aralkyl, alkoxy, halo, CN, CNS, amino, acyl and the like and $R^3$ is H, alkyl aryl or aralkyl which alkylidene-phosphorane is then (III) reacted with an aldehyde or ketone of the formula

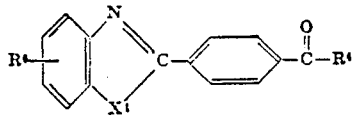

wherein $R^5$ and $R^6$ are the same as R and $R^1$ above, X' is the same as X and $R^4$ is the same as $R^3$. The resultant 4,4' bis'2-benzazolyl) stilbenes from this last reactive step are particularly useful as fluorescent brightening agents.